United States Patent
Horváth et al.

(10) Patent No.: US 9,954,430 B2
(45) Date of Patent: Apr. 24, 2018

(54) OVERVOLTAGE AND SURGE PROTECTION IN A POWER OVER ETHERNET DEVICE

(71) Applicant: Silicon Laboratories Inc., Austin, TX (US)

(72) Inventors: Vince András Horváth, Budapest (HU); Tamás Marozsák, Budapest (HU); Péter Onódy, Budapest (HU); John Gammel, Round Rock, TX (US)

(73) Assignee: Silicon Laboratories Inc., Austin, TX (US)

( * ) Notice: Subject to any disclaimer, the term of this patent is extended or adjusted under 35 U.S.C. 154(b) by 334 days.

(21) Appl. No.: 14/800,616

(22) Filed: Jul. 15, 2015

(65) Prior Publication Data
US 2017/0019262 A1    Jan. 19, 2017

(51) Int. Cl.
*H02M 1/32* (2007.01)
*H02M 1/36* (2007.01)

(52) U.S. Cl.
CPC .............. *H02M 1/36* (2013.01); *H02M 1/32* (2013.01)

(58) Field of Classification Search
CPC ........................................................ H20M 1/32
USPC ........................ 307/112, 113, 116, 125, 130
See application file for complete search history.

(56) References Cited

U.S. PATENT DOCUMENTS

| | | |
|---|---|---|
| 4,723,191 A | 2/1988 | Menniti |
| 5,210,675 A | 5/1993 | Palara |
| 6,728,084 B2 | 4/2004 | Ziemer et al. |
| 8,441,770 B2 | 5/2013 | Menegoli et al. |
| 2013/0148247 A1 | 6/2013 | Zhou et al. |

*Primary Examiner* — Adi Amrany
(74) *Attorney, Agent, or Firm* — Cesari & Reed LLP; R. Michael Reed

(57) ABSTRACT

In some embodiments, powered devices, circuits, and methods are disclosed that may include biasing a hot swap switch to couple a capacitor of a DC-DC converter to negative supply node when an input voltage exceeds a threshold and biasing a telephony switch to couple a positive supply node to a negative supply node when the input voltage exceeds the threshold. Further, the method may further include deactivating the hot swap switch after a period of time, and continuing to bias the telephony switch.

20 Claims, 4 Drawing Sheets

US 9,954,430 B2

OVERVOLTAGE AND SURGE PROTECTION IN A POWER OVER ETHERNET DEVICE

FIELD

The present disclosure is generally related to Power over Ethernet powered devices (PDs), and more particularly to PDs including overvoltage and surge protection circuitry

BACKGROUND

Power over Ethernet (POE) powered devices (PDs) receive power and data from a power sourcing equipment (PSE) device through Ethernet cables. The Institute of Electrical and Electronics Engineers (IEEE) defined a collection of standards defining the physical layer and data link layer's media access control of wired Ethernet, which standards may be referred to as IEEE 802.3. The POE standards were defined as a subsection within the IEEE 802.3 standard. IEEE 802.3af standard defines a POE standard wherein the PSE device provides a maximum continuous power per cable of approximately 15.4 Watts. The IEEE 802.3at standard specifies that the PSE may provide a maximum continuous power output of approximately 25.5 Watts.

In some embodiments, the PD may include surge protection circuitry configured to divert surge energy away from associated circuitry. Such surge energy may be associated with an electrostatic discharge (ESD) event, a power fault, or another event, which may be transient or which may continue to supply power to the PD.

SUMMARY

In some embodiments, a method may include biasing a hot swap switch to couple a capacitor of a DC-DC converter to negative supply when an input voltage exceeds a threshold and biasing a telephony switch to couple a positive supply node to a negative supply node when the input voltage exceeds the threshold. Further, the method may further include deactivating the hot swap switch after a period of time, and continuing to bias the telephony switch.

In other embodiments, a powered device may include a telephony switch including a drain coupled to a positive supply node, a gate, and a source coupled to a negative supply node. The powered device may further include a diode stack coupled between the positive supply node and the negative supply node and a hot swap switch having a drain coupled to the DC-DC converter ground, a gate, and a source coupled to the negative supply node. The hot swap switch may be configured to couple an input capacitor of a DC-DC converter to negative supply in response to a transient event. The powered device may also include a circuit coupled to the gate of the telephony switch and configured to activate the telephony switch in response to a transient event.

In still other embodiments, a powered device may include a DC-DC converter including an input capacitor coupled between a positive supply node and the DC-DC converter ground. The powered device may further include a surge protection circuit including a diode stack, a telephony switch, a hot swap switch, and a control circuit. The diode stack may be coupled between the positive supply node and the negative supply node. The telephony switch may include a drain coupled to the positive supply node, a gate, and a source coupled to a negative supply node. The hot swap switch may include a drain coupled to the DC-DC converter ground, a gate, and a source coupled to the negative supply node. The control circuit may include an input coupled to a node within the diode stack, a first output coupled to the gate of the hot swap switch, and a second output coupled to the gate of the telephony switch. The control circuit may be configured to activate the hot swap switch and the telephony switch in response to a voltage at the node within the diode stack.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Figure 1:
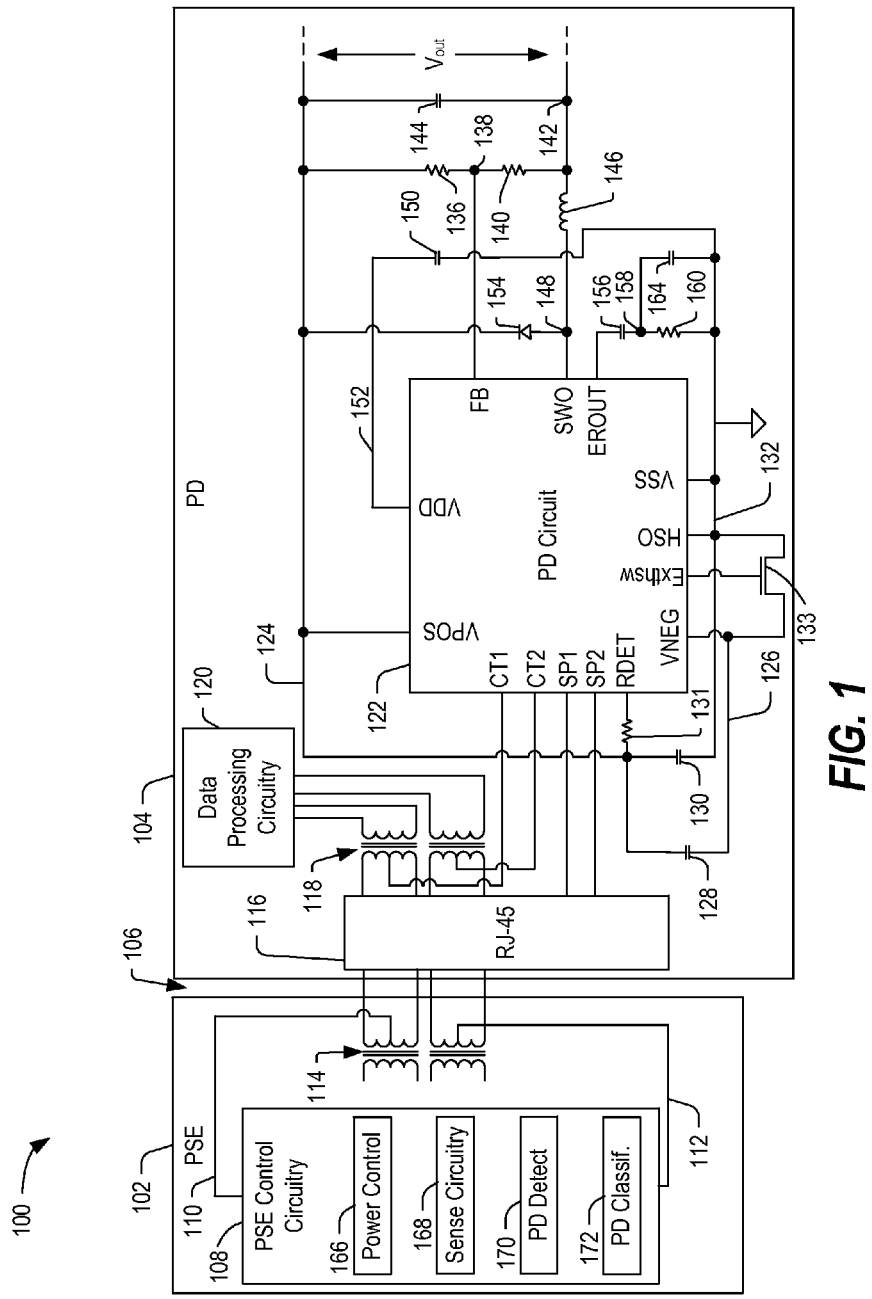
FIG. 1 is a partial block diagram and partial circuit diagram of a POE system including a PSE and a PD, in accordance with certain embodiments of the present disclosure.

POE enabled devices may have to withstand overvoltage stress according to the IEEE 802.3at standard. In an example, the overvoltage stress may include a short duration high voltage surge, such as when the device is excited with a 1000 volt pulse lasting 50 μs. In another example, the POE enabled device may be exposed to a telephony ringing voltage, which can be as high as 175 volts (AC) (50 Hz plus 56 volts DC) for several milliseconds, such as 100 ms.

Embodiments of a POE device are described below that may include overvoltage and surge protection circuitry configured to ensure that internal wires of a circuit of a POE device are not exposed to a voltage that exceeds a threshold voltage, whether the device is exposed to a surge or other overvoltage event. In an example, a user may accidentally plug a POE device into a telephone line, which may produce an overvoltage event. In certain embodiments, the device may include a hot swap switch that may be configured to allow current flow during ordinary operation. When an input voltage exceeds a threshold voltage (such as 57 volts), a breakdown diode string (such as a zener diode string) may provide a detection signal to a controller, which may be configured to activate a hot swap switch to provide surge protection. In this example, the hot swap switch may short the surge current from a positive supply node to negative supply node through an input capacitor of a direct current (DC) to DC converter. The surge power may be dissipated by a surge source resistance and a portion of the surge power may be transferred into the input capacitor of the DC-DC converter, which may accumulate charge. The size of the capacitor should be selected to ensure a sufficiently low voltage after a surge that the voltage may be dissipated safely without damaging the circuitry. After a period of time, the controller (or control circuit) may deactivate the hot swap switch to decouple the capacitor of the DC-DC converter from a supply node, such as negative supply node.

Embodiments of the POE device may further include a telephony switch that may be selectively activated to provide a DC current path between the positive supply node and negative supply node. In general, the hot swap switch may be able to short the current for a period of time, such as several milliseconds. However, by coupling the capacitor to negative supply node, the total charge accumulating on the capacitor of the DC-DC converter may continue to increase. In the telephony case, a maximum voltage may be up to 225 volts, and the source resistance may be approximately 400 Ohms (Ω). By providing a DC current path to short the positive supply node to negative supply node, an overvoltage due to telephony ringing may be dissipated mostly through the source resistance. In some embodiments, the telephony switch may be smaller in area than the hot swap switch. In certain embodiments, the telephony switch may be a metal oxide semiconductor field effect transistor (MOSFET) that is approximately one-quarter ($\frac{1}{4}^{th}$) of the size of the hot swap switch. Since a larger portion of a surge current would be dissipated through the hot swap switch and since a portion of the surge current may be dumped into charging the capacitor of the DC-DC converter, the smaller MOSFET may be sufficient to dissipate the charge as a DC current over time.

In some embodiments, the overvoltage and surge protection circuit may be incorporated in a PD, which may be configured to receive power and data through twisted pair cabling (such as an Ethernet cable). One possible example of a PD including overvoltage and surge protection circuitry is described below with respect to FIG. 1.

FIG. 1 is a partial block diagram and partial circuit diagram of a Power over Ethernet (POE) system 100 including a powered device (PD) 104 having overvoltage and surge protection circuitry, in accordance with certain embodiments of the present disclosure. The POE system 100 may include a power sourcing equipment (PSE) device 102, which may be coupled to the PD device 104 though twisted pair (Ethernet) cabling 106. The PSE device 102 may include PSE control circuitry 108, which may be coupled between a first node 110 and a second node 112. The first node 110 may be coupled to a center tap of a first transformer of a transformer pair 114, and the second node 112 may be coupled to a center tap of the second transformer of the transformer pair 114. The transformer pair 114 may inject power onto selected wires of the twisted pair cabling 106.

The PSE control circuitry 108 may be coupled to a power supply (not shown) and to other circuitry to provide a functional PSE device 102. Further, the PSE control circuitry 108 may include power control circuitry 166, which may be configured to selectively deliver power to the nodes 110 and 112. The PSE control circuitry 108 may further include PD detect circuitry 170 that may be configured to perform POE powered device (PD) detection operations, in conjunction with the power control circuitry 166, to apply a PD detection signal to the twisted pair cabling 106 in accordance with the IEEE POE standard. The PSE control circuitry 108 may also include sense circuitry 168 configured to detect a PD detection signature in response to the PD detection signal. The PSE control circuitry 108 may further include PD classification circuitry 172 configured to cooperate with the power control circuitry 166 to provide a PD classification signal to the twisted pair cabling 106 and to determine a power classification of the PD device 104 based on a PD classification signature detected by the sense circuitry 168. The power control circuitry 166 may supply power to the PD 104 according to the power classification determined from the PD classification signature. The PD detection signature and the PD classification signature (and associated power requirements) are defined in the IEEE POE standard.

The PD 104 may include an interface (such as an RJ-45 connector 116), which may be configured to couple to the twisted pair cabling 106 and which may be coupled to transformer circuitry 118. The transformer circuitry 118 may provide data from the twisted pair lines to data processing circuitry 120. Further, center taps of the transformer circuitry 118 may be coupled to center tap nodes (CT1 and CT2) of a PD circuit 122. The PD circuit may include high-voltage supply input nodes (SP1 and SP2), which may be coupled to a spare wire pair of the RJ-45 connector 116 and which may be polarity-insensitive. Further, the PD circuit 122 may be coupled between a positive voltage supply node 124 (VPOS of the PD circuit 122 and a negative voltage supply node 126 (VNEG). The PD 104 may include a capacitor 128 coupled between the positive voltage supply node 124 and the negative voltage supply node 126. The PD 104 may also include a capacitor 130 coupled between the positive voltage supply node 124 and a node 132, which can be the ground of the DC-DC converter. The node 132 may be coupled to a hot-swap output node (HSO) and a source voltage node (VSS) of the PD circuit 122. The PD 104 may further include a detection resistor 131 (which may be an external precision detection resistor) coupled between the node 124 and an input node (RDET) of the PD 102.

The PD 104 may include a resistor 136 coupled between the positive voltage supply node 124 and a feedback node 138, and may include a resistor 140 coupled between the feedback node 138 and a negative voltage supply output node 142. The positive voltage supply node 124 and the negative voltage supply output node 142 may cooperate to provide an output voltage (Vout), which may provide power to associated circuitry. An output capacitor 144 may be coupled between the positive voltage supply node 124 and the negative voltage output node 142. The PD 104 may further include an inductor 146 coupled between a switching transistor output (SWO) 148 and the negative voltage supply output node 142. Further, the PD 104 may include a capacitor 150 coupled between a node 152 and the hot swap output (HSO) node 132. The node 152 may be coupled to a voltage supply node (VDD). The PD 104 may also include a diode 154 including an anode coupled to the node 148 and a cathode coupled to the positive voltage supply node 124.

In some embodiments, the PD 104 may include a capacitor 156 coupled between an error amplifier output node (EROUT) and a node 158. The PD 104 may include a resistor 160 coupled between the node 158 and a node 132, which may be coupled to the source voltage node (VSS). The PD 104 may also include a capacitor 164 coupled between the nodes 158 and 132. Further, the PD 104 may include a bypass transistor 133 including a drain coupled to a first node 132, a source coupled to a second node, such as the negative supply node 126, and a gate coupled to an external hot swap switch node (Exthsw).

In some embodiments, the PD circuit 122 may include a diode bridge to rectify the input voltage and to provide the rectified input voltage to a first supply node. The PD circuit 122 may further include a hot swap switch including a drain coupled to the node 132, a gate coupled to a control circuit, and a source coupled to the negative supply node 126. Further, the PD circuit 122 may include a telephony switch including a drain coupled to the positive supply node 124, a gate, and a source coupled to the negative supply node 126.

In some embodiments, if the type of event can be determined, then the hot swap switch may be activated in response to a surge event or the telephony switch may be activated in response to a telephony overvoltage event. However, in certain embodiments, the PD circuit may have difficulty distinguishing a surge event from a telephony overvoltage event, at least at the beginning. If only the hot swap switch is activated in response to the unknown type of event, the hot swap switch may couple a capacitor of a DC-DC converter to the negative supply node 126, transferring current from the positive supply node into a capacitor of a DC-DC converter coupled between the nodes 124 and 132 for a period of time (such as 200 μs). If the unknown type of event is due to a telephony voltage, the capacitor of the DC-DC converter may slowly charge up fully and may reach a voltage level corresponding to the breakdown voltage level of a diode stack. If the telephony switch were activated at this point, discharging the capacitor could damage the telephony switch trying to dissipate the energy in the capacitor to the negative supply node 126. If only the telephony switch is activated in response to the unknown type of event and the event turns out to be a surge event, the telephony switch may be damaged.

Accordingly, in certain embodiments, in response to a voltage in excess of a threshold (such as 100 volts), the PD circuit 122 may activate both the hot swap switch and the telephony switch to dissipate the excess voltage. The hot swap switch may couple the input capacitor of the DC-DC converter to the negative supply node 126, transferring some of the excess energy into the capacitor for a period of time. After about 200 μs (a period of time longer than a surge event), a control circuit may turn off the hot swap switch, decoupling the capacitor from the negative supply node 126 to prevent further charge from accumulating in the capacitor. The telephony switch may remain biased to discharge the capacitor and to sink additional current to the negative supply node 126. The power dissipated through the telephony can be calculated according to the following equation:

$$P = \frac{(V_{Pos} - V_{Neg})^2}{rds} \quad (1)$$

where the variables ($V_{Pos}$ and $V_{Neg}$) refer to the voltages on the positive and negative supply nodes 124 and 126, and where the variable (rds) refers to the resistance of the telephony switch when the MOSFET is turned on. In this example, when the surge event is over or after a period of time, the hot swap switch may turn off, but the telephony switch may continue to discharge the capacitor of the DC-DC converter, allowing for protection against continuous telephony voltage (such as a ringing event).

In a conventional PD, a circuit may include a voltage clamping device that clamps the voltage between the positive and negative supply nodes at a voltage level that is above a maximum normal input voltage of 57V. In some instances, the circuit may also transfer input surges to the input capacitor of the DC-DC converter. However, to protect against telephony ringing, the voltage clamping device may dissipate too much power and may be too large, occupying a large amount of circuit real estate. Further, the DC-DC input capacitor may eventually charge to a large enough voltage due to the telephony ringing that is not able to protect other circuitry. However, by providing a diode stack to clamp the voltage, by turning off the hot swap switch after a period of time, and by activating a telephony switch to couple the positive and negative supply nodes to discharge the capacitor, the charge on the input capacitor may be limited and then discharged so that associated circuitry may be protected from further power surge events.

Figure 2:
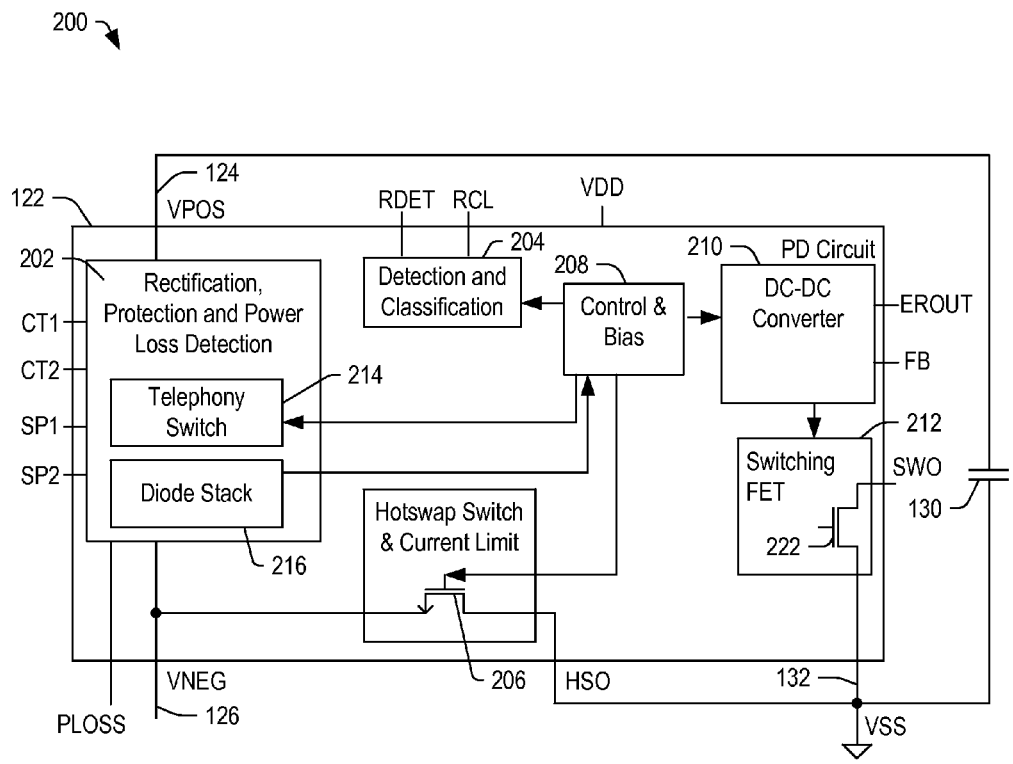
FIG. 2 is a block diagram of a PD including overvoltage and surge protection circuitry, in accordance with certain embodiments of the present disclosure.

FIG. 2 is a block diagram of a PD 200 including overvoltage and surge protection circuitry, in accordance with certain embodiments of the present disclosure. The PD device 200 may include the PD circuit 122. The PD circuit 122 may include rectification, protection and power loss circuitry 202, which may be coupled to the center taps of the transformer circuitry 118 in FIG. 1 via center tap nodes (CT1 and CT2) and which may be coupled to the RJ-45 connector via high-voltage supply input nodes (SP1 and SP2). The rectification, protection and power loss circuitry 202 may also be coupled between the positive voltage supply node (VPOS) 124 and the negative voltage supply node 126 (VNEG) (in FIG. 1). In some embodiments, the rectification, protection and power loss circuitry 202 may include a telephony switch 214 and a diode stack 216, which may be coupled between the positive supply node (VPOS) 124 and the negative supply node (VNEG) 126.

The diode stack 216 may be formed of a plurality of breakdown diodes (such as zener diodes) arranged in series between the positive supply node (VPOS) 124 and the negative supply node (VNEG) 126. The diode stack 216 may include a tap that may be coupled to the control and bias circuit 208 and may be configured to provide a signal to the control and bias circuit 208 when the differential voltage between the positive supply node 124 and the negative supply node 126 exceed a threshold voltage (defined by the breakdown voltages of the diodes in the diode stack 216).

In some embodiments, the control and bias circuit 208 may turn on the switching FET 206 and the telephony switch 214 in response to an overvoltage event detected based on the diode stack 216 breaking down and conducting current. The switching FET 206 may include a drain coupled to the node 132, a gate coupled to the control and bias circuit 208, and a source coupled to the negative supply node (VNEG) 126. After a period of time, the control and bias circuit 208 may turn off the switch FET 206 and may continue to bias the telephony switch 214 in an active mode to dissipate energy from a capacitor 130 of a DC-DC converter 210 and to dissipate any further current between the positive supply node 124 and the negative supply node 126. The capacitor 130 may be coupled between the positive supply node 124 and the VSS node 132.

The PD circuit 122 may further include a detection and classification circuit 204 coupled to the resistance detection input node (RDET) and to the classification input node (RCL). The detection and classification circuit 204 may respond to PD detection signals, received at the rectification, protection and power loss detection circuit 202, by providing a PD detection signature that may be detected by a PSE device 102 to determine the presence of a powered device. The detection and classification circuit 204 may also respond to PD classification signals by providing an appropriate PD classification signature, which may be detected by the PSE device 102 to determine the power requirements of the PD 104.

The control and bias circuit 208 may be coupled to the detection and classification circuit 204 and coupled to the DC-DC converter 210. Further, the control and bias circuit 208 may be coupled to a hot swap switch and current limit circuit 206.

The DC-DC converter 210 may be coupled to an error amplifier output node (EROUT) and to a feedback node (FB). The DC-DC converter circuit 210 may also be coupled to a switching field effect transistor (FET) 212, which may be coupled to the VSS node 132 and to a switch output node (SWO). The switching FET 212 may include a MOSFET having a drain coupled to the switch output node (SWO), a gate coupled to the control and bias circuit 208, and a source coupled to the VSS node 132.

In some embodiments, in response to a voltage in excess of the threshold, the diode stack 216 may provide a signal to the control and bias circuit 208, which may provide a control signal configured to cause the hot swap switch (MOSFET) 206 to turn on to shunt current corresponding to a transient event (i.e., a surge event) from the positive supply node 124 to the negative supply node (VNEG) through the DC-DC capacitor 130. Further, in response to the voltage in excess of the threshold, the telephony switch 214 may be activated substantially concurrently with the turning on of the hot swap switch (MOSFET) 206. When the transient event is over or after a period of time (such as 200 µs), the hot swap switch (MOSFET) 206 may be turned off or may resume normal operation. However, the telephony switch (MOSFET) 214 may remain on to discharge the capacitor 130 of the DC-DC converter 210. When the voltage across the capacitor 130 falls below a second threshold, the telephony switch 214 may be turned off, allowing the PD circuit 122 to resume normal operation.

In some embodiments, in response to a surge or overvoltage event, the diode stack 216 may dissipate a portion of the energy from the surge or overvoltage event. The control and bias circuit 208 may activate the switching FET 206 to couple the capacitor 130 of the DC-DC converter 210 to the negative supply node 126 and may activate the telephony switch 214. A portion of the energy may be dissipated in the source resistance, and a portion of the energy may be stored in the capacitor 130 of the DC-DC converter 210. After a period of time, the control and bias circuit 208 may deactivate the switching FET 206 to decouple the capacitor 130 of the DC-DC converter 210 from the negative supply node 126 and may maintain the telephony switch 214 in an active mode to discharge the capacitor 130. Other embodiments are also possible.

Figure 3:
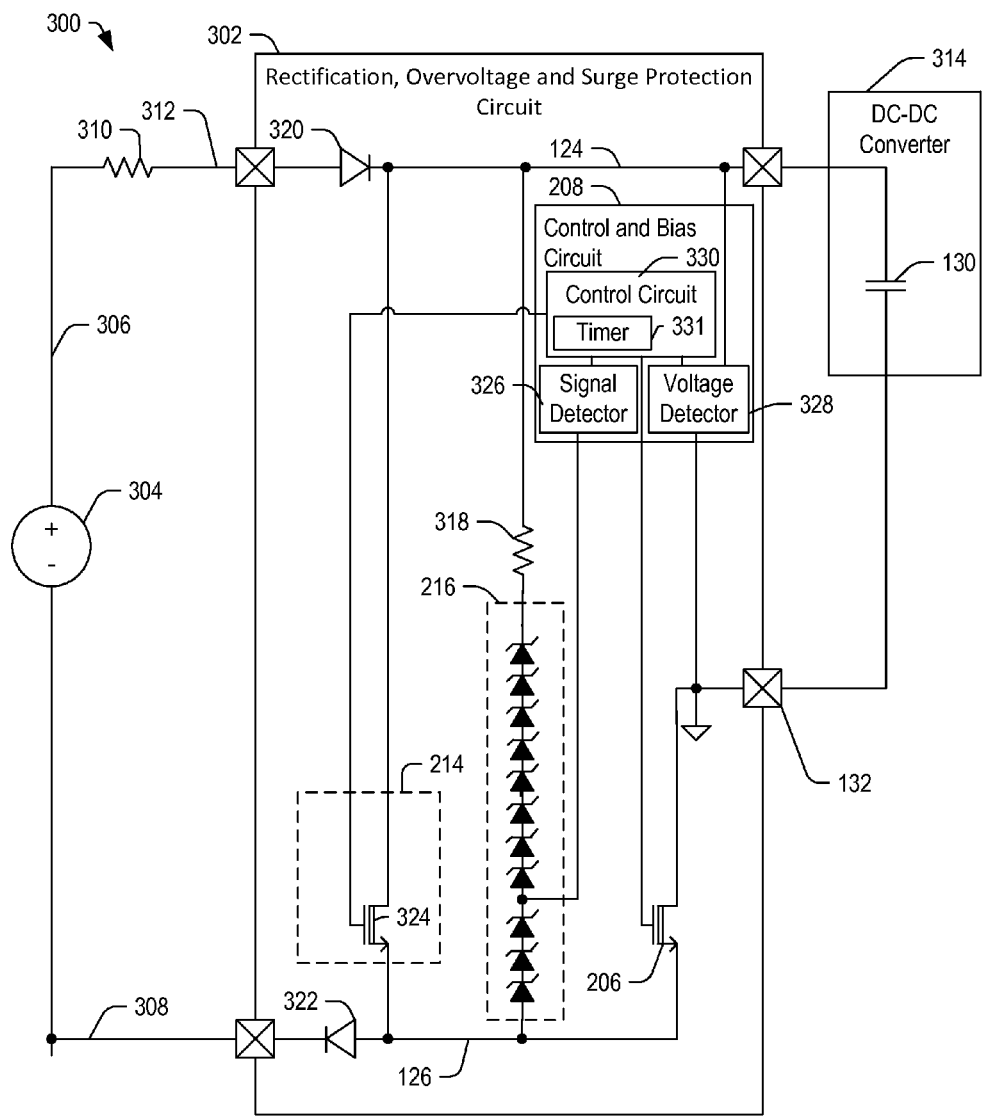
FIG. 3 is a diagram of a circuit configured to provide overvoltage and surge protection, in accordance with certain embodiments of the present disclosure.

FIG. 3 is a diagram 300 of a circuit 302 configured to provide overvoltage and surge protection, in accordance with certain embodiments of the present disclosure. In some embodiments, the circuit 302 may be a rectification, overvoltage and surge protection circuit that may be part of the PD circuit 122 of FIGS. 1 and 2. The circuit 302 may be coupled to an input voltage, which may be represented by a voltage source 304 coupled between a first node 306 and a second node 308. The first node 306 may be coupled to a resistor 310, which may be coupled to a second node 312 at an input of the circuit 302. The circuit 302 may also be coupled to a DC-DC converter 314, which may include a capacitor 130 coupled between the positive supply node 124 and the VSS node 132.

The circuit 122 may include a diode 320 including an anode coupled to the node 312 and a cathode coupled to the positive supply node 124. The circuit 122 may further include a diode 322 including an anode coupled to the negative supply node 126 and a cathode coupled to the node 308. The diodes 320 and 322 may be the forward biased diodes of a diode bridge.

The circuit 302 may further include a telephony switch 214 including a MOSFET 324, which may include a drain coupled to the positive supply node 124, a gate coupled to a control and bias circuit 208, and a source coupled to the negative supply node 126. The control and bias circuit 208 may be coupled to the positive supply node 124 and to the negative supply node 126. The control and bias circuit 208 may also be coupled to the gate of the hot swap switch (MOSFET) 206. The hot swap switch (MOSFET) 206 may include a drain coupled to the VSS node 132, a gate coupled to the control and bias circuit 208, and a source coupled to the negative supply node 126. In some embodiments, the source of the hot swap switch (MOSFET) 206 may be coupled to the negative supply node 126, which may be coupled to an external switch, such as 133 in FIG. 1.

The circuit 302 may further include a current limit resistor 318 coupled between the positive supply node 124 and the diode stack 216. The diode stack 216 may be formed from a plurality of breakdown diodes, such as zener diodes, arranged in series between the positive supply node 124 and the negative supply node 126. The diode stack 216 may include a tap or node between adjacent diodes in the stack, which node may be coupled to a control and bias circuit 208. The control and bias circuit 208 may be coupled between a positive supply node 124 and the VSS node 132. Further, the control and bias circuit 208 may be coupled to the gate of the hot swap switch (MOSFET) 206 and to the telephony switch 214. The diode stack 216, the hot swap switch (MOSFET) 206, and the control and bias circuit 208 may cooperate to provide surge protection circuitry.

In some embodiments, the diode stack 216 may define a voltage threshold (such as a voltage threshold between 57 volts and 100 volts), which may be a voltage level that is above a normal operating voltage and that is sufficiently low to protect associated circuitry by clamping the voltage at or below the threshold level. When a differential voltage across the diode stack 216, from the positive supply node 124 to the negative supply node 126, is greater than the threshold voltage, a voltage at the tap or node within the diode stack 216 may increase to a level sufficient to provide a signal to the control and bias circuit 208. The control and bias circuit 208 may include the signal detector 326 coupled to the node or tap of the diode stack 216 and configured to detect a voltage or other signal. In response to detecting the voltage or other signal, the signal detector 326 may communicate the detection to a control circuit 330, which may apply a bias signal to the gate of the MOSFET 206 and to the gate of the telephony switch 324, activating (or biasing) the telephony switch 324 to conduct current between the positive supply node 124 and the negative supply node 126. The control circuit 330 may include a timer 331. The control circuit 330 may maintain the bias signals for a period of time (based on the timer 331) before removing the bias signal from the gate of the hot swap switch (MOSFET) 206. The period of time may be a period such as 200 µs, or some other period of time that is longer than a typical surge transient event but that is short enough to prevent the input capacitor 130 and other circuitry of the DC-DC converter 314 from reaching the breakdown voltage level. The control circuit 330 may maintain the bias signal at the gate of the telephony switch (MOSFET) 324 until the input capacitor 130 is discharged or until the transient event ends. When the transient event ends and the diode stack 216 ceases conducting, the control circuit 330 may continue to provide the bias signal to the gate of the telephony switch (MOSFET) 324 until the voltage between the positive supply node 124 and the VSS node 132 falls below a threshold voltage level (as determined by voltage detector 328). When the voltage falls below the threshold voltage level, the control circuit 330 may deactivate the telephony switch 324 by removing the bias signal.

In this example, at least a portion of the energy of the transient event may be dissipated in the source resistance (i.e., resistor 310) as current flows through the diode stack 216, through the telephony switch 214, and into the capacitor 130. Whether the transient event is a power surge event or a telephony ringing event, the power may be safely dissipated through the combination of the hot swap switch 206 and the telephony switch 214 without exposing associated circuitry (such as data processing circuitry 120 in FIG. 1) to excess maximum voltage.

Figure 4:
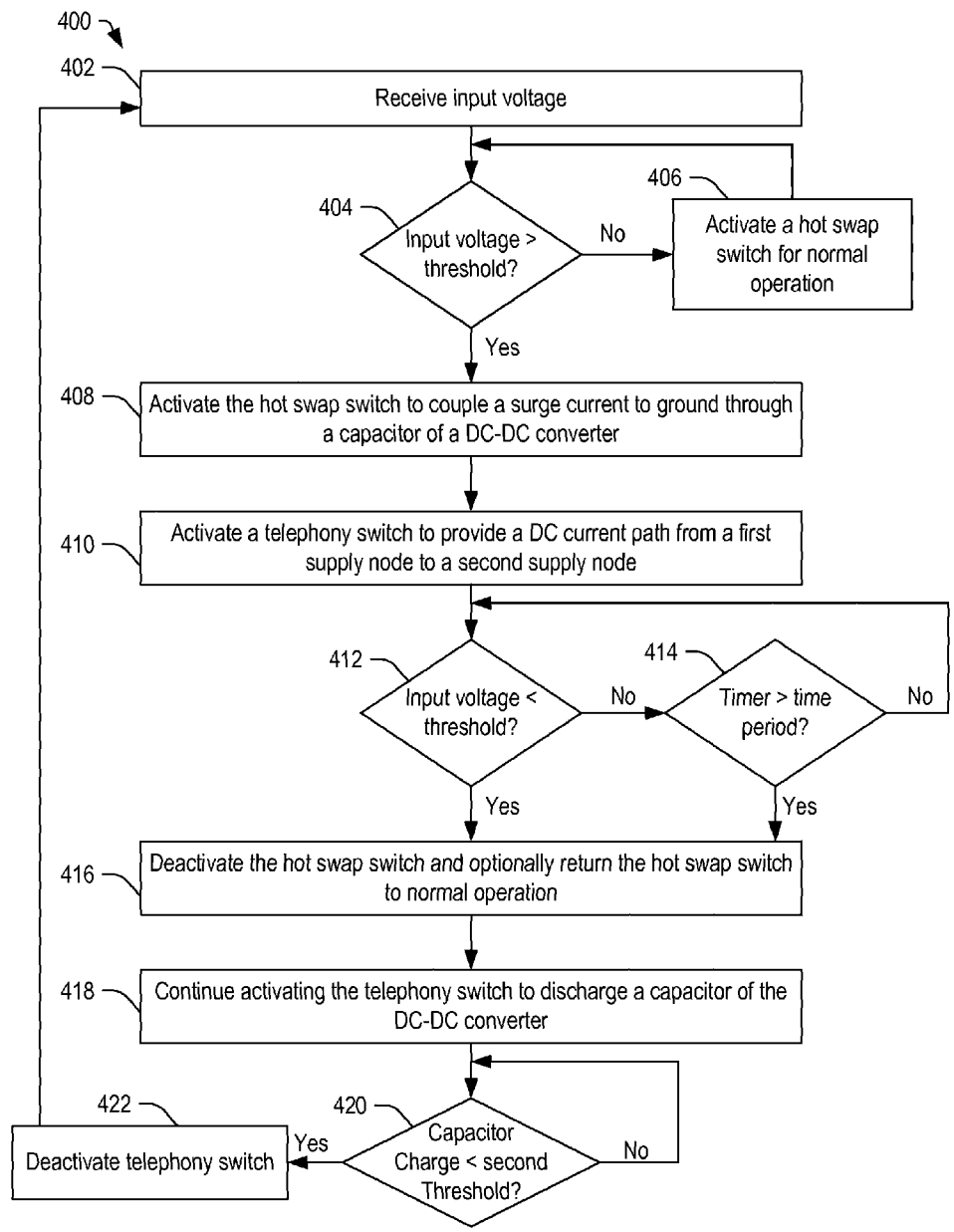
FIG. 4 is a flow diagram of a method of providing overvoltage and surge protection, in accordance with certain embodiments of the present disclosure.

FIG. 4 is a flow diagram of a method 400 of providing overvoltage and surge protection, in accordance with certain embodiments of the present disclosure. The method 400 may include receiving an input voltage, at 402. In some embodiments, the input voltage may be received at inputs of a rectifier circuit (such as a diode bridge) or may be received at inputs of a PD circuit. If the voltage is less than a threshold voltage, at 404, the method 400 may include activating a hot swap switch for normal operation, at 406. The method 400 may then return to 404 to determine if the input voltage exceeds the threshold.

Returning to 404, if the input voltage exceeds the threshold, the method 400 may include activating the hot swap switch to couple a surge current to negative supply through a capacitor of a DC-DC converter, at 408. By coupling the input capacitor of the DC-DC converter to negative supply node, some of the energy of the surge event may be stored by the capacitor.

The method 400 may also include activating a telephony switch to provide a DC current path from a first supply node to a second supply node, at 410. In some embodiments, the telephony switch may couple a positive supply node 124 to a negative supply node 126. In some embodiments, the telephony switch may be activated when the hot swap switch is activated.

The method 400 may further include comparing the input voltage to the threshold. At 412, if the input voltage is greater than the threshold, the method 400 may determine if the timer exceeds a time period at 414. If not, the method 400 returns to 412 to continue to monitor the input voltage. If, at 412, the input voltage is less than the threshold or if the timer exceeds the timer period at 414, the method 400 may include deactivating the hot swap switch and optionally returning the hot swap switch to normal operation, at 416.

At 418, the method 400 may further include continuing to activate the telephony switch to discharge a capacitor of the DC-DC converter. At 420, if the capacitor charge is greater than a second threshold, the method 400 may include continuing to discharge the capacitor. Otherwise, at 420, if the capacitor charge is less than the second threshold, the method 400 may include deactivating the telephony switch 422 and returning to 402 to receive the input voltage.

In some embodiments, activation of the hot swap switch may cause at least a portion of the surge energy to be stored in the input capacitor of the DC-DC converter. Activation of the telephony switch may slow the charge of the capacitor of the DC-DC converter during the transient event and may further discharge the capacitor when the transient event is over. The telephony switch and the hot swap switch cooperate to prevent the transient event from damaging associated circuitry by limiting the voltage and by discharging the excess power.

In conjunction with the circuits, methods, and systems described above with respect to FIGS. 1-4, a powered device is disclosed that includes transient event protection circuitry configured to protect against surge events as well as telephony ringing events. In an example, the circuitry may include a telephony switch and a hot swap switch. In response to a transient event (e.g., overvoltage, surge, telephony ringing, etc.), both the telephony switch and the hot swap switch are activated to sink the transient current and limit the transient voltage on PD device. Once the transient event is over or after a period of time, the hot swap switch may be deactivated and the telephony switch may remain on to provide a DC current path for discharging of a capacitor of the DC-DC converter and to protect against continuous overvoltage such as telephony ringing.

Although the present invention has been described with reference to preferred embodiments, workers skilled in the art will recognize that changes may be made in form and detail without departing from the scope of the invention.

What is claimed is:

1. A method comprising:
biasing a hot swap switch to couple a capacitor of a DC-DC converter between positive and negative supply nodes when an input supply voltage exceeds a threshold, the hot swap switch having a drain coupled to a first node, a gate, and a source coupled to the negative supply node, the hot swap switch configured to couple an input capacitor of a DC-DC converter to the negative supply node in response to a transient event based on a signal applied to the gate by a control circuit;
biasing a telephony switch to couple the positive supply node to the negative supply node when the input voltage exceeds the threshold, the telephony switch including a drain coupled to the positive supply node, a gate, and a source coupled to the negative supply node, a control circuit coupled to the gate of the telephony switch and configured to activate the telephony switch in response to the transient event; and
after a period of time, deactivating the hot swap switch using the control circuit and continuing to bias the telephony switch.

2. The method of claim 1, further comprising:
monitoring a capacitor voltage across the capacitor; and
deactivating the telephony switch when the capacitor voltage falls below a second threshold.

3. The method of claim 1, wherein biasing the hot swap switch comprises shunting a transient current through the capacitor and the hot swap switch to dissipate a transient surge event and to store energy from the transient surge event in the capacitor.

4. The method of claim 3, wherein at least a portion of a power associated with the transient surge event is dissipated by a source resistance associated with a source of the input voltage.

5. The method of claim 1, wherein biasing the telephony switch comprises shorting the positive supply node to the negative supply node through the telephony switch to dissipate a ringing voltage due to a telephony ringing event.

6. The method of claim 5, wherein at least a portion of the ringing power is dissipated by a source resistance associated with a source of the input voltage.

7. A powered device comprising:
a telephony switch including a drain coupled to a positive supply node, a gate, and a source coupled to a negative supply node;
a diode stack coupled between the positive supply node and the negative supply node;
a hot swap switch having a drain coupled to a first node, a gate, and a source coupled to the negative supply node, the hot swap switch configured to couple an input capacitor of a DC-DC converter to the negative supply node in response to a transient event; and a circuit coupled to the gate of the telephony switch and configured to activate the telephony switch in response to the transient event.

8. The powered device of claim 7, wherein the circuit is coupled to a node within the diode stack to detect the transient event when the diode stack conducts current and to the gate of the hot swap switch.

9. The powered device of claim 8, wherein:
the controller includes a timer; and
in response to the transient event, the controller is configured to bias the gate of the hot swap switch to couple the input capacitor to the negative supply node to sink a transient surge event for a period of time based on the timer and to turn off the hot swap switch after the period of time has expired.

10. The powered device of claim 9, wherein at least a portion of a power associated with the transient event is dissipated by a source resistance associated with a source of an input voltage applied to the positive supply node and the negative supply node.

11. The powered device of claim 7, wherein the telephony switch comprises:
a drain coupled to the positive supply node;
a gate responsive to a control signal from the circuit; and
a source coupled to the negative supply node.

12. The powered device of claim 11, wherein the circuit is configured to bias the gate of the telephony switch to short the positive supply node to the negative supply node through the telephony switch to dissipate a ringing voltage due to a telephony ringing event.

13. The powered device of claim 12, wherein at least a portion of the ringing power is dissipated by a source resistance associated with a source of the input voltage.

14. The powered device of claim 12, wherein the circuit is configured to bias the telephony switch to provide the DC current path for a period of time after the transient event has ended.

15. The powered device of claim 14, wherein:
the circuit turns off the hot swap switch after a period of time; and
the circuit continues to bias the telephony switch to discharge the input capacitor after the hot swap switch is turned off.

16. The powered device of claim 7, wherein the circuit comprises:
a signal detector coupled to a node within the diode stack to detect when the diode stack is conducting current;
a controller configured to activate the telephony switch in response to detecting the diode stack conducting the current, the controller including a timer; and
a voltage detector configured to detect a voltage between a positive supply node and a second node and to provide a voltage signal to the controller representing the detected voltage; and wherein the controller is configured to activate the telephony switch and the hot swap switch in response to detecting the diode stack conducting the current, to turn off the hot swap switch after a period of time, and to continue to bias the telephony switch to conduct current until the detected voltage falls below a threshold voltage level.

17. A powered device comprising:
a DC-DC converter including an input capacitor coupled between a positive supply node and a second node;
a surge protection circuit including:
a diode stack coupled between the positive supply node and the negative supply node;
a telephony switch including a drain coupled to the positive supply node, a gate, and a source coupled to a negative supply node;
a hot swap switch including a drain coupled to the second node, a gate, and a source coupled to the negative supply node; and
a control circuit including an input coupled to a node within the diode stack, a first output coupled to the gate of the hot swap switch, and a second output coupled to the gate of the telephony switch, the control circuit configured to activate the hot swap switch and the telephony switch in response to a voltage at the node within the diode stack.

18. The powered device of claim 17, wherein the control circuit is configured to:
turn off the hot swap switch after a period of time; and
maintain the telephony switch in an on state to discharge the input capacitor.

19. The powered device of claim 17, wherein the control circuit comprises:
a signal detector coupled to the node within the diode stack to detect a voltage indicating that the diode stack is conducting current; and
a timer;
the control circuit configured to turn off the hot swap switch when the timer exceeds a period of time.

20. The powered device of claim 19, wherein the control circuit further comprises:
a voltage detector coupled between the positive supply node and the second node to detect a voltage across the capacitor; and
wherein the controller is configured to:
bias the telephony switch to conduct current in response to the voltage; and
continue to bias the telephony switch to conduct current after the hot swap switch is turned off and until the voltage across the capacitor falls below a threshold.

* * * * *